May 5, 1931.　　　　R. O. DUNHAM　　　　1,804,328
SHIP PROPULSION
Filed Aug. 31, 1927
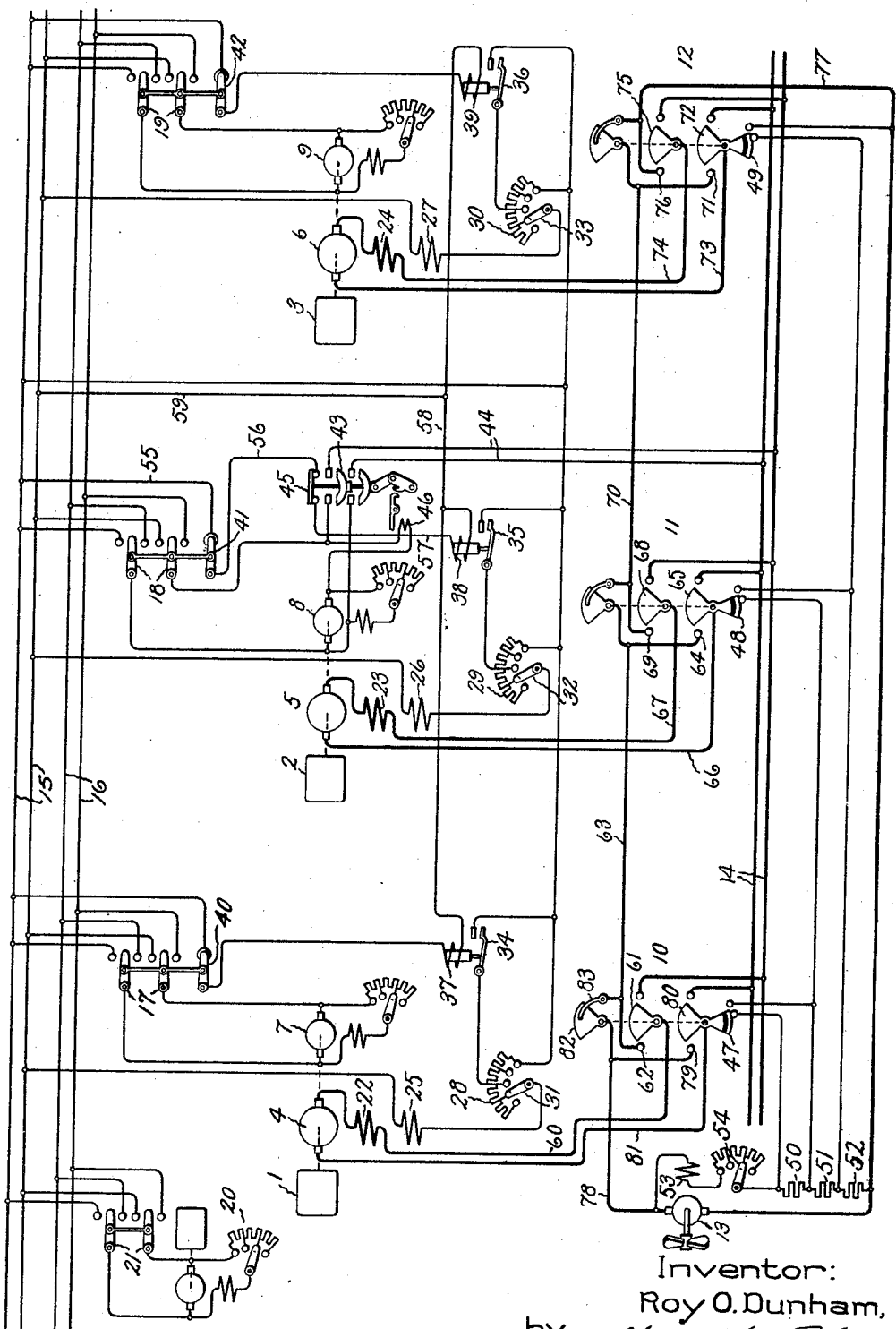
Inventor:
Roy O. Dunham,
by Alexander F. ____
His Attorney.

Patented May 5, 1931

1,804,328

UNITED STATES PATENT OFFICE

ROY O. DUNHAM, OF SCHENECTADY, NEW YORK, ASSIGNOR TO GENERAL ELECTRIC COMPANY, A CORPORATION OF NEW YORK

SHIP PROPULSION

Application filed August 31, 1927. Serial No. 216,670.

My invention relates to improvements in power systems such as may be used for ship propulsion and has as an object an improved arrangement of apparatus whereby a prime mover or motor driving suitable generating means is caused to be more uniformly loaded. According to one embodiment of my invention wherein a plurality of generators are used as the generating means I accomplish this result by increasing the output of one of the generators when another of the generators is disconnected from a load circuit or by decreasing the output of one of the generators when another of the generators is connected to a load circuit.

My invention is particularly serviceable in installations where one prime mover is used to drive a main generator and a direct connected exciter that may or may not be loaded when the main generator is loaded due to other provisions being made for furnishing excitation. By decreasing the main generator load when the exciter is loaded and increasing the main generator load when the exciter is not loaded I am able to even out the loading of the prime mover which may then be caused to operate substantially at full load at all times and hence have a greater efficiency. Although my invention is applicable to stationary as well as propulsion systems I believe it will find its greatest applicability in propulsion systems where it is necessary to reduce dead weight to a minimum.

In the single figure of the drawing I have illustrated my invention as applied in a ship propulsion system, the magnetically controlled switches being shown in the positions they occupy when the system is deenergized.

In the system illustrated power is furnished by a plurality of prime movers 1, 2 and 3 to main generators 4, 5 and 6 and auxiliary generators 7, 8 and 9 respectively connected to said prime movers. The main generators 4, 5 and 6 may be electrically connected by switches 10, 11 and 12 either in series with the propeller motor 13 or in parallel with a main power circuit 14 although under certain conditions it may prove desirable to interlock the switches so that the generators may not operate in parallel while yet permitting any one generator to be connected to the power circuit. The auxiliary generators 7, 8 and 9 may be connected by switches 17, 18 and 19 with either the excitation bus 15 or bus 16 which may be used to supply energy to auxiliaries such as motors and lights used aboard ship. An auxiliary prime mover generating plant 20 is also provided in the system shown for supplying power through switch 21 to either bus 15 or 16 when the main sets including generators 7, 8 and 9 are disabled or not running.

The main generators 4, 5 and 6 are illustrated as compound generators with series fields 22, 23 and 24 and separately excited shunt fields 25, 26 and 27. The shunt fields are connected to the exciter bus 15 through rheostats 28, 29 and 30 and the individual excitation of the main generators may be severally adjusted by moving the arms 31, 32 and 33 of these rheostats so as to include more or less resistance in the respective field circuits. I have also made provision for short-circuiting an effective portion of resistances 28, 29 and 30 by switches 34, 35 and 36 when their operating coils 37, 38 and 39 are energized to control the load capacities of generators 4, 5 and 6. The operating circuit for these coils which are connected across the exciter bus 15 includes auxiliary switches 40, 41 and 42 associated with the main switches 17, 18 and 19. These auxiliary switches are so related to the main switches that when the main switches are closed to complete a power connection the auxiliary switches are opened and when the main switches are opened the auxiliary switches are closed.

By means of a switch 43 and the circuit 44 exciter 8 of the central unit may also be connected to the main power bus 14. Associated with switch 43 is an auxiliary switch 45 which is in series with auxiliary switch 41 in the circuit of the operating coil 38 of switch 35. By this arrangement if either switch 18 or switch 43 is closed coil 38 of switch 35 is deenergized and the excitation of the main generator 5 is reduced. Switch 43 may be tripped by an overload coil 46 through which the total load current of auxiliary generator 8 flows. By this arrangement it will be noted that upon an overload the auxiliary generator may shed that portion of its load furnished to bus 14 while at the same time maintaining its connection to the exciter bus 15 or the auxiliary bus 16.

Associated with each of the main switches 10, 11 and 12 are auxiliary switches 47, 48 and 49 which function to short-circuit sections of resistances 50, 51 and 52 in series with the field 53 of the propeller motor 13. The relation of the auxiliary switches 47, 48 and 49 to the main switches 10, 11 and 12 is such that whenever a main generator 4, 5 or 6 is disconnected from the propeller motor the field of the propeller motor is weakened whereby the remaining generators are caused to work at full load by reason of the readjustment of the motor field in accordance with the impressed voltage. The field strength of motor 13 may be further adjusted by means of a rheostat 54.

The operation of the system is as follows: Upon starting the prime movers 1, 2 and 3, generators 7, 8 and 9 will build up their voltage, being shunt machines, and depending on the operation of switches 17, 18 and 19 may supply power to either or both buses 15 and 16. Generator 8 may also supply power to bus 14 through switch 43. Assuming that switch 17 is thrown upward so as to connect generator 7 to bus 15 and that switch 19 is thrown downward so as to connect generator 9 to the auxiliary bus 16 it will be noted that under operating conditions there is no further requirement for the loading of generator 8 which may consequently be run unloaded, switches 18 and 43 being left in their open position. When switch 17 is moved to its upward position to connect the generator 7 to bus 15 the circuit through coil 37 of switch 34 is interrupted by auxiliary switch 40, and consequently switch 34 remains in an open position irrespective of the fact that bus 15 to which coil 37 is adapted to be connected is energized. The same operation takes place in connection with the right-hand unit when generator 9 is connected by switch 19 to the auxiliary bus 16 when switch 42 interrupts the circuit through coil 39 of switch 36. It thus occurs that when auxiliary generators 7 and 9 are connected to a load circuit the main generators 4 and 6 associated with them and driven by the same prime movers 1 and 3 are operated with a weakened field and consequently deliver less load than would be the case if switches 34 and 36 were closed. However, in the central unit where neither switches 18 or 43 have been closed coil 38 will be energized through conductor 55, switch 41, conductor 56, switch 45, conductor 57, and conductors 58 and 59 and will close switch 35 thereby shorting out a portion of the resistance 29 in series with field 26 of the main generator 5. Generator 5 will thus be more strongly excited than generators 4 and 6 and will deliver more power to the common load. The adjustment is such that under the conditions just described prime movers 1, 2 and 3 are practically equally loaded, the sum of the loads of the generators 4 and 7 and 6 and 9 respectively being approximately equal to the load of generator 5. If now for any reason exciter 8 should be used to supply current to buses 15 or 16 through switch 18 or to bus 14 through switch 43 the circuit through coil 38 will be broken by either switch 41 or 45 and the output of generator 5 reduced by the consequent weakening of its field through the introduction of the portion of resistance 29 inserted by the opening of switch 35 to a value comparable to that of generators 4 and 6.

It will thus be seen that by my illustrated arrangement as soon as connections are completed so that an auxiliary generator may assume load I simultaneously decrease the load capacity of a main generator driven by the same prime mover as the auxiliary generator so that this prime mover may be operated to its best advantage and that when an auxiliary generator is disconnected from its load circuit I cause the main generator to assume more load. It is further to be noted that my arrangement is positive and not dependent on the operation of a load current relay or similar device which may fail to function properly at a crucial moment.

By moving switches 10, 11 and 12 to the left each generator 4, 5 and 6 may be connected in series with the propeller motor 13. The connections when the switches are thrown to the left are as follows: from generator 4 through conductor 60, switch segment 61, switch contact 62, conductor 63, switch contact 64, switch segment 65, conductor 66, generator 5, conductor 67, switch segment 68, switch contact 69, conductor 70, switch contact 71, switch segment 72, conductor 73, generator 6, conductor 74, switch segment 75, switch contact 76, conductor 77, propeller motor 13, conductor 78, switch contact 79, switch segment 80, and conductor 81 back to generator 4. When the main switches are thrown to the left from their central positions the auxiliary switches 47, 48 and 49 are likewise operated to short circuit resistances, 50, 51 and 52 connected in the field circuit of the propeller motor. Any one of the switches 10, 11 and 12 may be returned to its central position to disconnect its corresponding generator from the propeller motor without at the same time interrupting the circuit of the remaining generators with the propeller motor. For example, if switch 10 is thrown to the central position generator 4 will be cut out of the motor circuit which will then be completed through conductor 78, switch segment 82, switch contact 83 and conductor 63, thence through the remaining switches and generators as previously described. At the same time the auxiliary switch 47 will open up the short circuit about the resistance 50 to weaken the field 53 of the propeller motor 13 to such an extent that operating with the remaining two generators the motor with its weakened field will still take full load current from the remaining generators. If any switch is thrown to the right from its central position its corresponding generator will be connected directly to the main power bus 14.

It is apparent to those skilled in the art that proposed arrangement may be modified to meet varying requirements without departing from my invention which has been shown and described in connection with a simplified arrangement for the purpose of clearly illustrating the invention. Thus although I have described my invention in connection with a system in which two generators are used as the generating means, it is apparent that a single generator, or more than two generators, may constitute the generating means. When a single generator is used its armature takes the place of the armatures of the generators shown in the described system. The excitation and load capacity of the single generator will be controlled as in the illustrated system by means operating substantially simultaneously with means for connecting a load circuit to the generating means or for disconnecting it therefrom. I, therefore, aim in the appended claims to cover all such changes and modifications as fall within the true spirit and scope of my invention.

What I claim as new and desire to secure by Letters Patent of the United States, is:—

1. An electric power system comprising a motor, electric generating means driven by said motor, a plurality of load circuits, means for connecting said load circuits to said generating means, means responsive to the operation of one of said connecting means for increasing the excitation of said generating means when one of said load circuits is disconnected from said generating means and means responsive to another of said connecting means for rendering said last mentioned means inoperative when another of said load circuits is connected to said generating means.

2. An electric power system comprising a motor, a plurality of generators driven by said motor, a plurality of load circuits, switches for connecting said generators to said load circuits and means mechanically connected to one of said switches for increasing the output of one of said generators when said switch is operated to disconnect one of said load circuits from another of said generators.

3. An electric power system comprising a motor, a plurality of generators driven by said motor, a plurality of load circuits for said generators, means for connecting said generators to said load circuits, and means operating substantially simultaneously with the means for connecting one of said generators to its load circuit for decreasing the output of another of said generators.

4. An electric power system comprising a motor, a plurality of generators driven by said motor, a plurality of load circuits, switches for connecting said generators to said load circuits, and means depending on the movement of one of said switches, associated with one of said generators for decreasing the load capacity of another of said generators when said switch is operated to complete a load circuit.

5. In a ship propulsion system, a generating unit comprising a prime mover, a main generator and an auxiliary generator driven by said prime mover, a load circuit, a main switch for connecting said auxiliary generator to said load circuit, and means associated with said main switch for decreasing the excitation of said main generator when said main switch is closed.

6. An electric power system comprising a motor, electric generating means driven by said motor, a plurality of load circuits, means for connecting said load circuits to said generating means, means responsive to the operation of one of said connecting means for increasing the excitation of said generating means when one of said load circuits is disconnected from said generating means, means responsive to the operation of another of said connecting means for rendering said last mentioned means inoperative when another of said load circuits is connected to said generating means, and means for disconnecting one of said load circuits from said generating means when the total load of said load circuits exceeds a predetermined value.

7. An electric power system comprising a plurality of motors, a plurality of electric generating means driven by said motors, a main load circuit, an auxiliary load circuit, means for connecting a plurality of said generating means in series to said main load circuit, means for independently connecting each of said generating means to and independently disconnecting each of said generating means from said auxiliary load circuit, and means for more uniformly and fully loading said motors including means, mechanically connected to and operated by movement of said means for connecting and disconnecting said auxiliary load, for decreasing the excitation of each generating means upon the connection of said auxiliary load thereto and for increasing the excitation of each generating means upon the disconnection of said auxiliary load therefrom.

8. A ship propulsion system comprising a plurality of prime movers, a plurality of electric generating means driven by said prime movers, a main load circuit, an auxiliary load circuit, means for connecting a plurality of said generating means in series to said main load circuit, means for connecting each of said generating means to said auxiliary load circuit, and means for preventing overloading of said prime movers including means mechanically associated with and responsive to the operation of the means for connecting said auxiliary load circuit to each of said generating means for decreasing the excitation of each generating means when it is connected to said auxiliary load circuit.

In witness whereof, I have hereunto set my hand this 30th day of August, 1927.

ROY O. DUNHAM.

DISCLAIMER 1,804,328.—*Roy O. Dunham*, Schenectady, N. Y. SHIP PROPULSION. Patent dated May 5, 1931. Disclaimer filed April 27, 1934, by the assignee, *General Electric Company*.

Therefore, enters this disclaimer to claims 3, 4, and 5 of said patent which are in the following words:

"3. An electric power system comprising a motor, a plurality of generators driven by said motor, a plurality of load circuits for said generators, means for connecting said generators to said load circuits, and means operating substantially simultaneously with the means for connecting one of said generators to its load circuit for decreasing the output of another of said generators.

"4. An electric power system comprising a motor, a plurality of generators driven by said motor, a plurality of load circuits, switches for connecting said generators to said load circuits, and means depending on the movement of one of said switches, associated with one of said generators for decreasing the load capacity of another of said generators when said switch is operated to complete a load circuit.

"5. In a ship propulsion system, a generating unit comprising a prime mover, a main generator and an auxiliary generator driven by said prime mover, a load circuit, a main switch for connecting said auxiliary generator to said load circuit, and means associated with said main switch for decreasing the excitation of said main generator when said main switch is closed."

[*Official Gazette May 29, 1934.*]